US012324450B2

(12) United States Patent
Gemili

(10) Patent No.: US 12,324,450 B2
(45) Date of Patent: Jun. 10, 2025

(54) BEVERAGES HAVING CLEAR APPEARANCE, SHELF STABILITY, HIGH PROTEIN, AND NEUTRAL pH

(71) Applicant: SOCIETE DES PRODUITS NESTLE S.A., Vevey (CH)

(72) Inventor: Seyhun Gemili, Bedminster, NJ (US)

(73) Assignee: Societe des Produits Nestle S.A., Vevey (CH)

( * ) Notice: Subject to any disclaimer, the term of this patent is extended or adjusted under 35 U.S.C. 154(b) by 669 days.

(21) Appl. No.: 17/294,039

(22) PCT Filed: Nov. 6, 2019

(86) PCT No.: PCT/EP2019/080320
§ 371 (c)(1),
(2) Date: May 14, 2021

(87) PCT Pub. No.: WO2020/104192
PCT Pub. Date: May 28, 2020

(65) Prior Publication Data
US 2022/0007688 A1 Jan. 13, 2022

Related U.S. Application Data

(60) Provisional application No. 62/769,364, filed on Nov. 19, 2018.

(51) Int. Cl.
*A23L 2/66* (2006.01)
*A23F 3/00* (2025.01)
(Continued)

(52) U.S. Cl.
CPC .................... *A23L 2/66* (2013.01); *A23F 3/00* (2013.01); *A23L 2/60* (2013.01); *A23L 2/84* (2013.01)

(58) Field of Classification Search
CPC . A23L 2/84; A23L 33/18; A23L 33/19; A23L 2/60; A23L 2/66; A23L 2/52; A23L 33/125; A23F 3/00
(Continued)

(56) References Cited

U.S. PATENT DOCUMENTS

| 2004/0156969 A1 | 8/2004 | Paulsen et al. |
| 2007/0172579 A1* | 7/2007 | Blanton ............... A23G 3/44 |
| | | 435/68.1 |
| 2014/0212565 A1 | 7/2014 | Bradley et al. |

FOREIGN PATENT DOCUMENTS

| CN | 101601487 | 12/2009 |
| CN | 108347953 A | 7/2018 |

(Continued)

OTHER PUBLICATIONS

Chinese Office Action for Chinese Appl No. 201980069135.4 dated Apr. 11, 2023.
(Continued)

*Primary Examiner* — Subbalakshmi Prakash
(74) *Attorney, Agent, or Firm* — K&L Gates LLP

(57) ABSTRACT

A method of making a beverage includes adding one or more other ingredients to hydrolyzed protein to form the beverage, which is clear, shelf-stable, and high protein and has a neutral pH and an energy content of at least about 100 kcal per 240 ml of the beverage. Optionally the hydrolyzed protein is obtained by subjecting protein to a protease. In some embodiments, the high protein is at least about 15 g or at least about 20 g of protein/100 kcal, and in some embodiments the energy content is at least about 150 kcal/240 ml or at least about 200 kcal/240 ml. Other aspects are directed to the resultant beverage, a method of producing a high protein beverage containing hydrolyzed protein, a method of increasing transparency in a high protein beverage contain-
(Continued)

ing hydrolyzed protein, and a method of providing nutrition to an individual.

20 Claims, 5 Drawing Sheets

(51) Int. Cl.
  *A23L 2/60* (2006.01)
  *A23L 2/84* (2006.01)
(58) Field of Classification Search
  USPC .......................................................... 426/597
  See application file for complete search history.

(56) References Cited

FOREIGN PATENT DOCUMENTS

| | | |
|---|---|---|
| JP | 2009261299 A | 11/2009 |
| WO | 2009011573 | 1/2009 |

OTHER PUBLICATIONS

Japanese Office Action for Appl No. 2021-521410 dated Sep. 27, 2023.

* cited by examiner

FIG. 3

| Major Ingredients | 10g, 100kcal | 10g, 150kcal | 10g, 200kcal | 15g, 100kcal | 15g, 150kcal | 15g, 200kcal | 20g, 100kcal | 20g, 150kcal | 20g, 200kcal |
|---|---|---|---|---|---|---|---|---|---|
| Whey Protein Isolate | 4.50% | 4.50% | 4.50% | 6.75% | 6.75% | 6.75% | 9.00% | 9.00% | 9.00% |
| Corn Syrup Solids (20-23DE) | 4.60% | 9.25% | 13.80% | 2.30% | 6.90% | 11.50% | 0.00% | 4.60% | 9.30% |
| White Sugar | 1.40% | 1.90% | 2.35% | 1.70% | 2.10% | 2.50% | 1.90% | 2.40% | 2.80% |
| Water | 89.50% | 84.35% | 79.35% | 89.25% | 84.25% | 79.25% | 89.10% | 84.00% | 78.90% |

BEVERAGES HAVING CLEAR APPEARANCE, SHELF STABILITY, HIGH PROTEIN, AND NEUTRAL pH

CROSS REFERENCE TO RELATED APPLICATIONS

The present application is a National Stage of International Application No. PCT/EP2019/080320, filed on Nov. 6, 2019, which claims priority to U.S. Provisional Patent Application No. 62/769,364, filed on Nov. 19, 2018, the entire contents of which are being incorporated herein by reference.

BACKGROUND

The present disclosure generally relates to beverages and methods of making such beverages. More specifically, the present disclosure relates to beverages based on hydrolyzed proteins, such as whey proteins, and the beverages have a clear appearance and a neutral pH.

Proteins are essential for the normal growth and development of humans. However, protein at or above 4% content in a ready-to-drink (RTD) beverage generally causes either turbidity or gelation at neutral pH.

Whey proteins are more stable to heat treatments at acidic environments, i.e., below pH 3.5. Therefore, one approach for stability of high protein beverages is to produce the product at an acidic environment. However, the high acid leads to increased astringency in taste.

Consequently, the method for producing a shelf stable, clear appearance, high protein beverage, i.e. use of acids, have significant drawbacks in the sensory attributes of the finished product.

SUMMARY

The present disclosure provides high protein, shelf stable, and clear appearance beverages at neutral pH conditions. To the best knowledge of the inventors, no such product is currently available on the market. As set forth in detail later herein, the inventors found that whey proteins hydrolyzed by a protease to make peptides could be processed using UHT heat treatment and then formulated to create clear appearance, shelf stable, and high protein beverages at neutral pH conditions. The inventors surprisingly found that increasing caloric density of the formulations, e.g., by increasing the amount of the carbohydrates, decreased the turbidity of the finished product. As a result, higher protein amounts per serving were managed to be added into formulation and still had clear appearance.

Various different concepts can be implemented in the clear, shelf-stable ready-to-drink high-protein beverages having a neutral pH. For example, a particular embodiment has no fat, which can be particularly advantageous for people avoiding fat intake. As another example, the hydrolyzed proteins in the beverages disclosed herein can be advantageous for consumers who are looking for fast protein absorption. As yet another example, tea-infused high protein beverages are provided by the present disclosure.

Accordingly, in a general embodiment, the present disclosure provides a method of making a beverage, the method comprising: hydrolyzing protein with a protease; and adding one or more other ingredients to the hydrolyzed protein to form the beverage, which has clear appearance, shelf-stability, high protein, a neutral pH and an energy content of at least about 100 kcal per 240 ml of the beverage.

In an embodiment, the protease is an enzyme from an animal source or an enzyme from a plant source, or from a microbial source, and in some embodiments, two or more enzyme types are present.

In an embodiment, the protease is selected from the group consisting of trypsin, chymotrypsin, pancreatin, papain, bromelain, and pepsin and mixtures thereof.

In an embodiment, the beverage comprises the protease.

In an embodiment, the method comprises inactivating the protease.

In an embodiment, the method comprises subjecting the hydrolyzed protein to ultra-high temperature (UHT) treatment.

In an embodiment, the beverage is a ready-to-drink (RTD) beverage.

In an embodiment, the beverage contains zero fat.

In an embodiment, the protein subjected to the hydrolyzing by the protease comprises whey protein.

In an embodiment, the one or more other ingredients comprise sugar in an amount up to 25% of the energy content of the beverage.

In an embodiment, the one or more other ingredients comprise tea.

In an embodiment, the high protein in the beverage is about 10 g to about 25 g protein/100 kcal of the beverage, and the energy content is about 100 kcal to about 360 kcal per 240 ml of the beverage.

In an embodiment, the high protein in the beverage is about 10 g to about 25 g protein/100 kcal of the beverage, and the energy content is about 100 kcal to about 300 kcal per 240 ml of the beverage.

In an embodiment, the high protein in the beverage is about 10 g to about 20 g protein/100 kcal of the beverage, and the energy content is about 100 kcal to about 200 kcal per 240 ml of the beverage.

In another embodiment, the present disclosure provides a beverage obtained by any of the methods disclosed herein.

In another embodiment, the present disclosure provides a beverage that has clear appearance, shelf-stability, high protein, a neutral pH and an energy content of at least about 100 kcal per 240 ml of the beverage, wherein the high protein comprises hydrolyzed protein. The beverage can comprise a protease that formed at least a portion of the hydrolyzed protein. The protease can be selected from the group consisting of trypsin, chymotrypsin, pancreatin, papain, bromelain, pepsin and mixtures thereof.

In an embodiment, the high protein consists essentially of the hydrolyzed protein.

In another embodiment, the present disclosure provides a method of increasing transparency of a beverage having high protein, at least a portion of the high protein comprising hydrolyzed protein, the method comprising: hydrolyzing protein with a protease to form the hydrolyzed protein; and adding one or more other ingredients to the hydrolyzed protein to form the beverage having high protein, and the beverage also has clear appearance, shelf-stability, a neutral pH and an energy content of at least about 100 kcal per 240 ml of the beverage, and optionally the high protein consists essentially of the hydrolyzed protein.

In another embodiment, the present disclosure provides a method of providing nutrition to an individual, the method comprising administering a beverage to the individual, the beverage has clear appearance, shelf-stability, high protein, a neutral pH and an energy content of at least about 100 kcal per 240 ml of the beverage, wherein the high protein comprises hydrolyzed protein, and optionally the high protein consists essentially of the hydrolyzed protein.

In another embodiment, the present disclosure provides a method of making a beverage for fast protein absorption, the method comprising: hydrolyzing protein with a protease to form the hydrolyzed protein; and adding one or more other ingredients to the hydrolyzed protein to form the beverage, which has clear appearance, shelf-stability, high protein, a neutral pH and an energy content of at least about 100 kcal per 240 ml of the beverage, and optionally the high protein consists essentially of the hydrolyzed protein.

Additional features and advantages are described in, and will be apparent from, the following Detailed Description and the Figures.

BRIEF DESCRIPTION OF DRAWINGS

FIG. 3 is a table showing the formulations tested in the experiment in Example 2 disclosed herein.

DETAILED DESCRIPTION

Definitions

Figure 1:
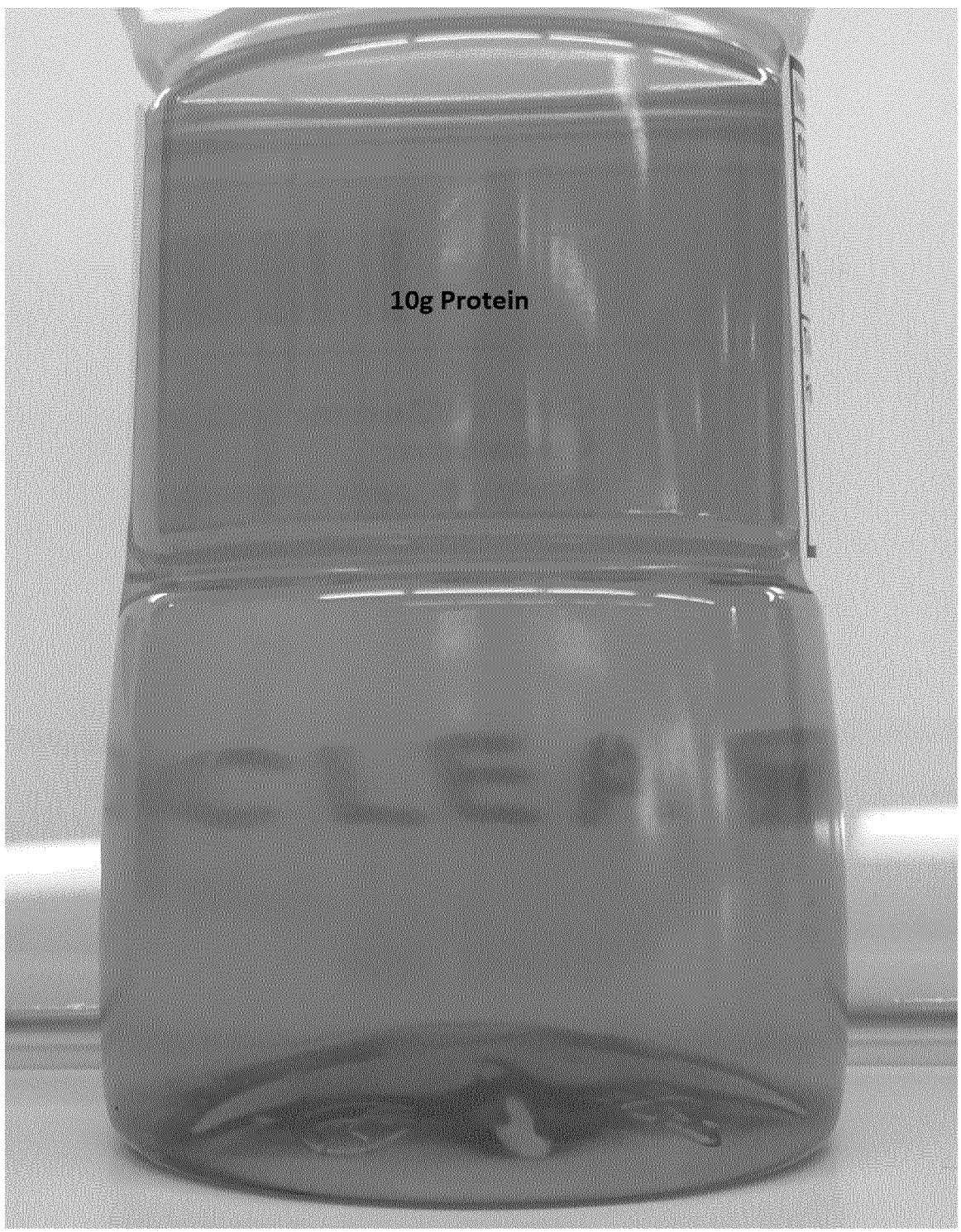
FIG. 1 is a photograph of a 10 g protein/100 kcal beverage according to an embodiment provided by the present disclosure, which was tested in the experiment in Example 1 disclosed herein.

Some definitions are provided hereafter. Nevertheless, definitions may be located in the "Embodiments" section below, and the above header "Definitions" does not mean that such disclosures in the "Embodiments" section are not definitions.

All percentages are by weight of the total weight of the composition unless expressed otherwise. Similarly, all ratios are by weight unless expressed otherwise. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. "Consisting essentially of" means that the embodiment or component thereof comprises more than 50 wt. % of the individually identified components, preferably at least 75 wt. % of the individually identified components, more preferably at least 85 wt. % of the individually identified components, most preferably at least 95 wt. % of the individually identified components, for example at least 99 wt. % of the individually identified components.

Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

"Animal" includes, but is not limited to, mammals, which includes but is not limited to rodents, aquatic mammals, domestic animals such as dogs and cats, farm animals such as sheep, pigs, cows and horses, and humans. Where "animal," "mammal" or a plural thereof is used, these terms also apply to any animal that is capable of the effect exhibited or intended to be exhibited by the context of the passage, e.g., an animal capable of autophagy. While the term "individual" is often used herein to refer to a human, the present disclosure is not so limited. Accordingly, the term "individual" refers to any animal, mammal or human that can benefit from the methods and compositions disclosed herein.

The relative terms "improved," "increased," "enhanced" and the like refer to the properties or effects of the composition comprising protein hydrolyzed by a protease (disclosed herein) relative to a composition with an identical formulation but in which the hydrolyzed protein was not formed by a protease.

The term "beverage" means a liquid, i.e., a free-flowing material of constant volume, that is intended for ingestion by an individual such as a human and provides at least one nutrient to the individual. The beverages of the present disclosure, including the many embodiments described herein, can comprise, consist of, or consist essentially of the elements disclosed herein, as well as any additional or optional ingredients, components, or limitations described herein or otherwise useful in a diet.

A "ready to drink" beverage or "RTD" beverage is a beverage in liquid form that can be consumed without further addition of liquid. Preferably the beverage is aseptic.

A "shelf-stable" beverage substantially maintains its viscosity and does not undergo destabilization such as phase separation, e.g. syneresis, layering, creaming and/or sedimentation, for at least nine months at 4° C., at least six months at 25° C., at least three months at 30° C., and at least one month at 38° C.

A "high-protein" beverage contains at least about 10.0 g of protein per 100 kcal serving, preferably at least about 12.0 g of protein per 100 kcal serving, more preferably at least about 15.0 g of protein per 100 kcal serving, most preferably at least about 18.0 g of protein per 100 kcal serving, such as at least about 20 g of protein per 100 kcal serving. In some embodiments, the high-protein beverages disclosed herein have no greater than about 25.0 g of protein per 100 kcal serving, for example no greater than about 22.0 g of protein per 100 kcal serving. As a specific non-limiting example, the high-protein beverage can contain about 15.0 g of protein per 100 kcal serving.

A "clear" beverage is visually transparent, like water, and has no cloudiness, like isotonic drinks, or turbidity, like opaque fruit juice. The transparency of a beverage may be quantified using known means for measuring the turbidity of liquid. For example, beverages having an absorbance of 0.35 or lower at a wavelength of 600 nm measured using an ultraviolet and visible spectrophotometer are encompassed by the terms "transparent" or "clear," and preferably such beverages have an absorbance of 0.25 or lower at a wavelength of 600 nm, most preferably an absorbance of 0.15 or lower at a wavelength of 600 nm.

A "neutral" pH is a pH of about 7.0. When reference herein is made to the pH, values correspond to pH measured at 25° C. with standard equipment.

Ultra high temperature ("UHT") heat treatment is heat treatment at a temperature of about 140° C. to about 151° C. for a time period of about 2 seconds to about 15 seconds, for example about 140° C. to about 145° C. for about 3 seconds to about 12 seconds, in a specific non-limiting example about 6 seconds at about 140° C.

EMBODIMENTS

An aspect of the present disclosure is a clear, shelf-stable ready-to-drink high-protein beverage, a neutral pH, and an energy content of at least about 100 kcal per 240 ml of the beverage. At least a portion of the protein is hydrolyzed protein obtained using one or more proteases, for example one or more of trypsin, chymotrypsin, pancreatin, papain, bromelain, and pepsin. In a preferred embodiment, trypsin and/or a trypsin-like enzyme is employed. In some embodiments, the purified form of the one or more proteases is used. Each of the one or more proteases can be from an animal source, from a plant source or from a microbial source. In some embodiments, the hydrolyzed protein comprises whey protein isolate and/or serum protein isolate.

Non-limiting examples of suitable formulations of the beverage include an embodiment in which the high protein in the beverage is about 10 g to about 25 g protein/100 kcal of the beverage, and the energy content is about 100 kcal to about 360 kcal per 240 ml of the beverage; another embodiment in which the high protein in the beverage is about 10 g to about 25 g protein/100 kcal of the beverage, and the energy content is about 100 kcal to about 300 kcal per 240 ml of the beverage; and yet another embodiment in which the high protein in the beverage is about 10 g to about 20 g protein/100 kcal of the beverage, and the energy content is about 100 kcal to about 200 kcal per 240 ml of the beverage.

Particularly preferred non-limiting embodiments include an embodiment having about 10 g to about 20 g protein per 100 kcal and an energy content of about 100 kcal to about 150 kcal per 240 ml (more preferably about 100 kcal to about 125 kcal per 240 ml) and another embodiment having about 10 g to about 15 g protein per 100 kcal and an energy content of about 100 kcal to about 200 kcal per 240 ml (more preferably about 10.0 g to about 12.5 g protein per 100 kcal).

The clear, shelf-stable ready-to-drink high-protein beverage preferably has low bitterness. A "low bitterness" beverage is a beverage having a bitterness less than a solution of 0.0700% caffeine, preferably less than a solution of 0.0650% caffeine, more preferably less than a solution of 0.0600% caffeine, even more preferably less than a solution of 0.0550% caffeine, most preferably less than a solution of 0.0500% caffeine.

The hydrolyzed protein is preferably obtained by hydrolysis of animal protein and/or vegetable protein, such as dairy proteins, e.g., one or more of casein, caseinate, casein hydrolysate, whey, whey hydrolysate, whey concentrate, whey isolate, milk protein concentrate, or milk protein isolate. Furthermore, the dairy protein subjected to hydrolysis may be, for example, sweet whey, acid whey, α-lactalbumin, β-lactoglobulin, bovine serum albumin, acid casein, caseinates, α-casein, β-casein and/or γ-casein. Additionally or alternatively, at least portion of the protein subjected to hydrolysis may be, for example, soy proteins, rice proteins, potato proteins, canola proteins, pea proteins, animal proteins (e.g., collagen peptides) and combinations thereof.

In a preferred embodiment, the protein in the beverage consists essentially of the hydrolyzed protein; in some embodiments, the protein in the beverage consists of the hydrolyzed protein, i.e., the entirety of the protein in the beverage is hydrolyzed protein. In a preferred embodiment, at least a portion of the hydrolyzed protein in the beverage is hydrolyzed whey protein. Preferably, the beverage is less than 0.5 wt. % fat, more preferably less than 0.1 wt. % fat, most preferably zero fat.

The neutral pH of the beverage may be established at least partially by a basic component. Non-limiting examples of suitable basic components include potassium hydroxide, sodium hydroxide, potassium bicarbonate, and mixtures thereof.

In an embodiment, the beverage can have a solids content of 9 to 40 wt. %, such as 12 to 20 wt. % or 14 to 23 wt. %.

The beverage can be made aseptic to avoid or minimize spoiling. Aseptic treatment of the beverage may be performed by pre-heating the beverage, for example to about 75 to 85° C., and then injecting steam into the beverage to raise the temperature to about 140 to 160° C., for example at about 150° C. The beverage may then be cooled, for example by flash cooling, to a temperature of about 75 to 85° C., homogenized again, further cooled to about room temperature and filled into containers, such as cans or bottles. Suitable apparatuses for aseptic treatment of the beverage are commercially available. The stabilizing system can maintain the aseptic RTD beverage in a homogenous state during storage.

The beverages can also include one or more additional ingredients such as flavorants, artificial sweeteners, natural sweeteners, colorants or a combination thereof. Nevertheless, in some embodiments, the beverage does not contain flavorants and is unflavored. Sweeteners can be sugar-based, such as sucrose, invert syrup, fructose syrup, glucose syrup with various DE, maltodextrins with various DE and combinations thereof, for example. Sugarless sweeteners can include, but are not limited to, sugar alcohols such maltitol, xylitol, sorbitol, erythritol, mannitol, isomalt and lactitol, hydrogenated starch hydrolysates, saccharin, cyclamate, acetosulfame, an L-aspartyl-based sweetener, or mixtures thereof.

Usage level of the flavorants, sweeteners and colorants will vary greatly and will depend on such factors as potency of the sweetener, desired sweetness of the beverage, the level and type of flavor used, and cost considerations. Any suitable combinations of sugar and/or sugarless sweeteners may be used in the beverages. In an embodiment, the beverage does not have artificial sweetener. Preferably, any sugar is present in an amount not greater than 25% of the energy content of the beverage. For example, an embodiment of the beverage comprises sugar in an amount that is 20-25% of the energy content of the beverage.

The beverage can further include one or more vitamins and/or minerals. Non-limiting examples of suitable vitamins include vitamin C and group B vitamins, and other non-limiting examples of suitable vitamins include ascorbic acid, ascorbyl palmitate, vitamins B1, B2, B6, B12, and Niacin (B3), or combination of thereof. The vitamins may also include Vitamins A, D, E and K and acid vitamins such as pantothenic acid, folic acid and biotin. The Vitamin A may be present as Vitamin A Palmitate. Vitamin D3 is an example of a suitable form of Vitamin D.

Non-limiting examples of suitable minerals include calcium, magnesium, iron or a combination thereof. The source of calcium can include calcium carbonate, calcium phosphate, calcium citrate, other insoluble calcium compounds or a combination thereof. The source of magnesium can include magnesium phosphate, magnesium carbonate, magnesium hydroxide or combination of thereof. The source of iron can include iron ammonium phosphate, ferric pyrophosphate, ferric phosphate, ferrous phosphate, other insoluble iron compounds, amino acids, iron chelating compounds such as EDTA, or combinations thereof. The minerals may also include zinc, iodine, copper, phosphorus, manganese, potassium, chromium, molybdenum, selenium, nickel, tin, silicon, vanadium and boron.

In an embodiment, the beverage further includes one or more free form amino acids. Non-limiting examples of suitable free form amino acids include Isoleucine, Alanine, Leucine, Asparagine, Lysine, Aspartate, Methionine, Cysteine, Phenylalanine, Glutamate, Threonine, Glutamine, Tryptophan, Glycine, Valine, Proline, Serine, Tyrosine, Arginine, Histidine or combinations thereof.

In another embodiment, the beverage further includes one or more prebiotics. Non-limiting examples of suitable prebiotics include fructooligosaccharides, inulin, lactulose, galactooligosaccharides, soyoligosaccharides, xylooligosaccharides, isomaltooligosaccharides, gentiooligosaccharides, lactosucrose, glucooligosaccharides, pecticooligosaccharides, resistant starches, sugar alcohols or a combination thereof.

In some embodiments, the RTD beverage is a tea beverage. "Tea" encompasses all types of leaf tea such as, for example, green tea, black tea, white tea, oolong tea, rooibos tea, chai tea, flavored tea, herbal tea, fruit tea, and combinations thereof "Leaf tea" refers to brewable tea and optionally other ingredients in any form such as complete, cut or chiseled leaves; small fragments of leaves; powder; dust; and combinations thereof. The tea can include the tea of a single tea variety or a mixture of one or more tea varieties. The tea can be caffeinated or decaffeinated.

These RTD tea beverages can contain tea extracts that may be obtained by conventional methods such as the hot aqueous extraction of tea leaves, for example. Temperatures of the aqueous extraction may vary from room temperature to up to 180° C. or more with elevated pressures.

Optionally, additional functional ingredients can be added to the beverage. Non-limiting examples of suitable functional ingredients include a probiotic, an enzyme, an antioxidant, a mineral salt, a gum, a phytochemical, dextrose, lecithin, a trace nutrient, a botanical extract, a flavor, an aroma, a fatty acid, oat beta-glucan or another functional fiber, creatine, carnitine, bicarbonate, citrate, caffeine or any mixture thereof.

In a specific embodiment, the beverage comprises hydrolyzed whey protein and one or more of water, glucose syrup from corn, sugar, or potassium hydroxide. In another specific embodiment, the beverage comprises hydrolyzed whey protein and one or more of water, maltodextrin, medium chain triglycerides, soybean oil, sucrose, pea fibre, calcium citrate, arabic gum, guar gum, soy lecithin, potassium citrate, potassium phosphate, magnesium chloride, (tuna) fish oil, sodium chloride, disodium hydrogen phosphate, choline bitartrate, vitamin C (sodium ascorbate), carrageenan, potassium chloride, corn starch, taurine, inositol, magnesium oxide, ferrous lactate, L-carnitine, glucose, natural flavoring substances, vitamin E, nicotinamide, zinc sulfate, vitamin B5, manganese sulfate, copper gluconate, vitamin B6, vitamin B2, sodium fluoride, vitamin B1, tocopherol, vitamin A, folic acid, potassium iodide, sodium molybdate, chromium trichloride, vitamin K1, sodium selenite, biotin, vitamin D3, citric acid, or vitamin B12. In yet another specific embodiment, the beverage comprises hydrolyzed whey protein and one or more of water, corn maltodextrin, medium chain triglycerides, corn starch, refined fish oil, oligofructose, safflower oil, soybean oil, inulin, taurine, L-carnitine, soy lecithin, guar gum, dimethylpolysiloxane, beta-carotene, vitamin A palmitate, vitamin D3, DL-alpha tocopheryl acetate, vitamin K1, sodium ascorbate, thiamine mononitrate, riboflavin, niacinamide, calcium pantothenate, pyridoxine hydrochloride, biotin, folic acid, cyanocobalamin, choline chloride, tricalcium phosphate, calcium chloride, magnesium chloride, sodium phosphate, potassium phosphate, ferrous sulphate, zinc sulphate, manganese sulphate, copper sulphate, potassium iodide, sodium selenate, sodium molybdate, or chromium trichloride.

These examples are non-limiting, and some embodiments omit one or more of these disclosed ingredients. Moreover, the beverages disclosed herein can optionally omit any conventional ingredient, for example for a "clean" label or other purpose, such as limiting or eliminating artificial ingredients or synthetic chemicals. The beverage can contain the enzyme used for the hydrolysis; and/or at least a portion of the enzyme can be inactivated, for example, by heat. At least a portion of the inactivation can be performed before packaging and sealing the container storing the beverage, and/or at least a portion of the inactivation can be performed after packaging and sealing the container storing the beverage.

Another aspect of the present disclosure is a method of making one or more of the embodiments of the clear, shelf-stable ready-to-drink high-protein beverage having a neutral pH as disclosed herein. For example, the protein can be subjected to hydrolysis before, during and/or after addition of the other ingredients. The mixture of the ingredients can be homogenized, for example from 35 to 175 bars at about 70° C. The homogenized mixture can be subjected to UHT heat treatment. The heat treated mixture can then undergo a second homogenization, preferably aseptic homogenization, from 35 to 175 bars at about 70° C. The UHT heat treatment can be followed by cooling and aseptic filling of the ready to drink beverage into a suitable container.

Another aspect of the present disclosure is a method of providing nutrition to an animal such as human. The method comprises administering to the animal any of the embodiments of the clear, shelf-stable ready-to-drink high-protein beverages having a neutral pH as disclosed herein.

EXAMPLES

The following non-limiting examples present scientific data developing and supporting the concept of clear, shelf-stable ready-to-drink high-protein beverages and having a neutral pH as provided by the present disclosure.

Example 1

Summary

Using a trypsin-like protease, whey proteins were hydrolyzed to make peptides then processed using UHT heat treatment. The hydrolyzed whey proteins were then formulated to create clear appearance, shelf-stable, and high-protein beverages at neutral pH conditions. Two example formulations are listed below.

Formulation 1:
88.7% Water
6.1% DE25 Glucose Syrup from Corn
4.13% whey protein isolate
1.05% sugar
0.012% microbial trypsin
0.01% potassium hydroxide Formulation 2:
89.28% Water
6.2% whey protein isolate
3% DE25 Glucose syrup from corn
1.5% sugar
0.019% microbial trypsin
0.01% potassium hydroxide Both formulations were designed for a 240 ml serving size. 100 calories per serving was targeted, and only 20-25% of the calories were from sugar. Formulation 1 supplied 10 grams of protein, and Formulation 2 supplied 15 grams of protein per serving.

Figure 2:
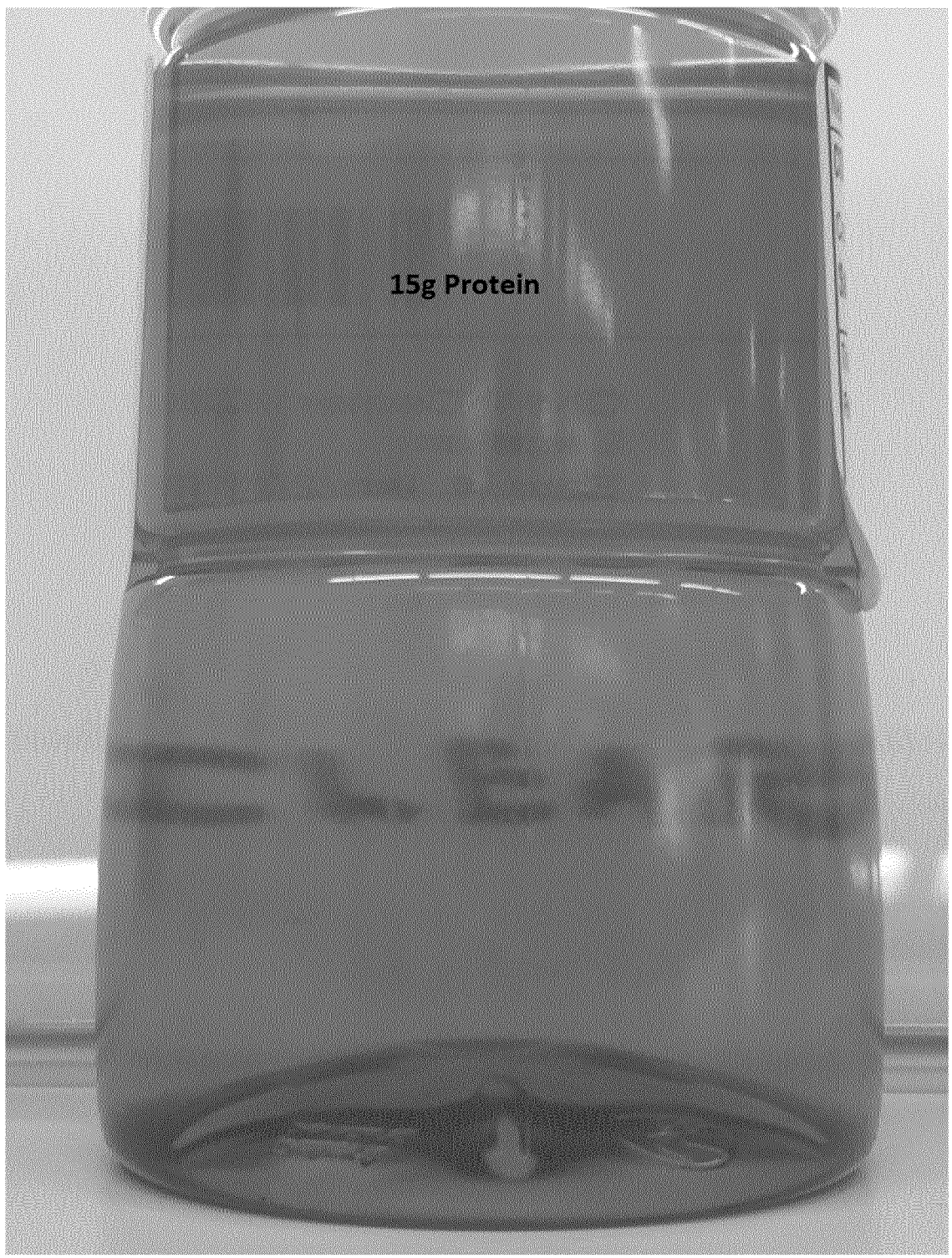
FIG. 2 is a photograph of a 15 g protein/100 kcal beverage according to an embodiment provided by the present disclosure, which was tested in the experiment in Example 1 disclosed herein.

FIGS. 1 and 2 show the clear appearance of the products with 10 grams protein per serving and 15 gram proteins per serving respectively. The absorbance was below 0.15 at a wavelength of 600 nm measured using an ultraviolet and visible spectrophotometer; specifically, the 10 g protein formulation had an absorbance of 0.133, and the 15 g protein formulation had an absorbance of 0.149.

Example 2

Whey protein isolate was hydrolyzed with a trypsin-like enzyme to make peptides that can be heat processed at varying protein and calorie amounts at neutral pH conditions. The inventors surprisingly found that increasing total amount of calorie in the formulation increased the clarity of the finished product that had same levels of protein amount. The inventors also surprisingly found that the finished product could maintain the same clarity while increasing protein amount along with calorie amount. Additionally, products that are made in larger scales were tasted against commercially available high protein beverages that contain hydrolyzed whey proteins; and prototypes were scored for their bitterness. The experimental prototypes were found significantly less bitter compared to the commercially available hydrolyzed whey protein beverage.

Specifically, a total of 54 bench scale experiments were conducted to investigate the effect of total protein (three levels: 10, 15, and 20 g per serving), total calorie (three levels: 100, 150, and 200 kcal per serving), enzyme to protein ratio (two levels: 0.2% and 0.3%), and hydrolysis time (three levels: 60, 90, and 120 min) on the turbidity and viscosity of the finished product (formulations in the table of FIG. 3). One serving is defined as 240 ml. During the hydrolysis time, the temperature was kept at 45-55° C. and the pH was kept at 7.0-7.5 using potassium hydroxide solution. At the end of the hydrolysis, corn syrup solids and sugar were added and the temperature was increased to 75° C. and held at this temperature for five minutes. After inactivation of the enzyme, the finished products were transferred into 240 ml bottles, and the bottles were put into an ice bath to cool the product down. Finally, cooled products were held at refrigerated temperatures overnight. After overnight storage, products were tested at room temperature for turbidity at 600 nm and for viscosity using spindle 1 at 60 rpm.

Figure 4:
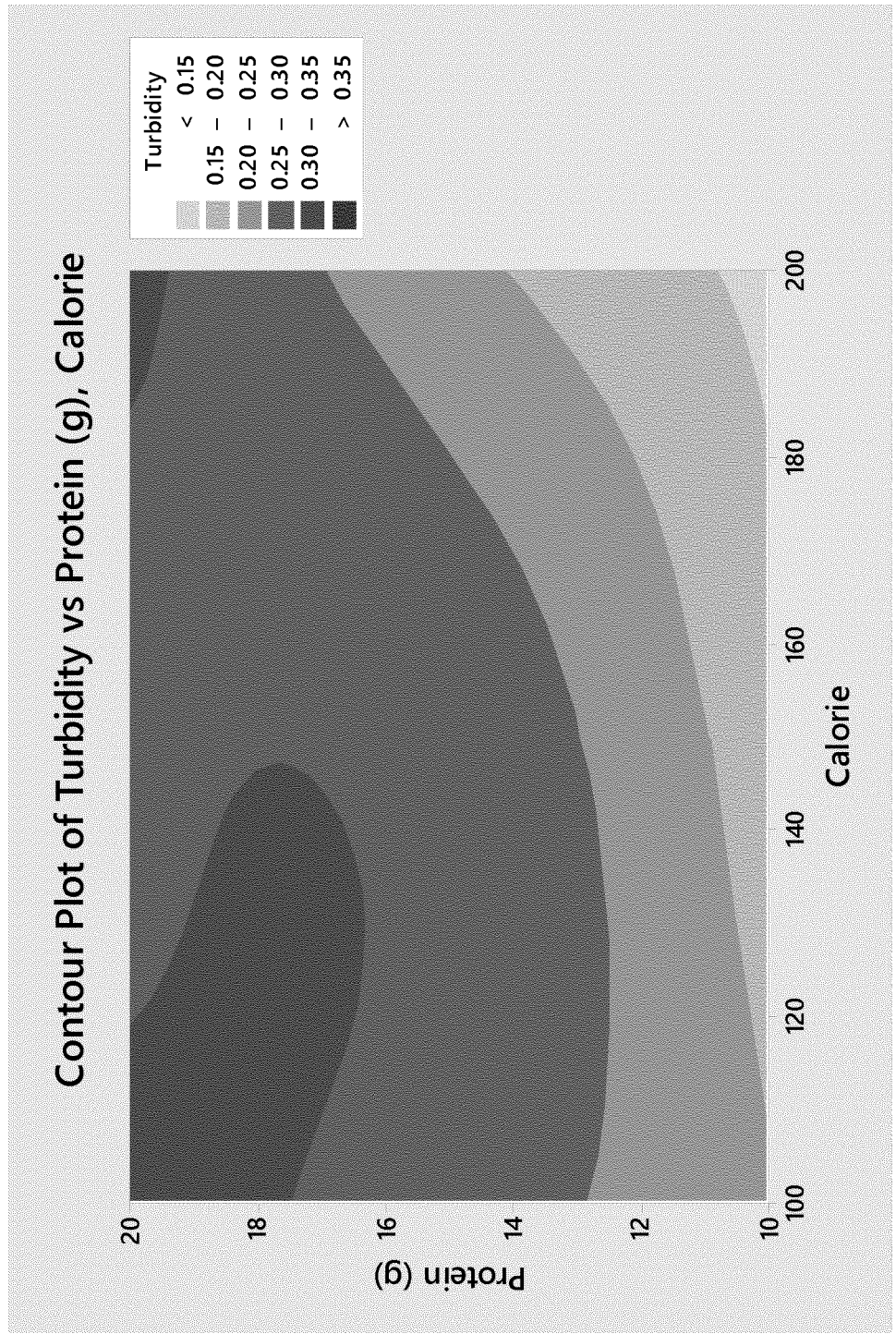
FIG. 4 is a graph showing a contour plot of turbidity vs. protein (g) and calories from the experiment in Example 2 disclosed herein

FIG. 4 shows the contour plot of turbidity vs Protein and Calorie variations. As seen in this figure, the turbidity of the finished product decreased with increasing calorie content. For example, keeping the protein content at 10 g, turbidity decreased from the range of 0.20-0.25 at 100 kcal to less than 0.15 at 200 kcal. Furthermore, the turbidity could be kept the same as protein content and calorie content were increased together. For example, the turbidity range was between 0.20-0.25 at 100 kcal when the protein content was between about 10-12 g, and the same turbidity was seen at 200 calories when higher protein content was between 14-17 g per serving.

Figure 5:
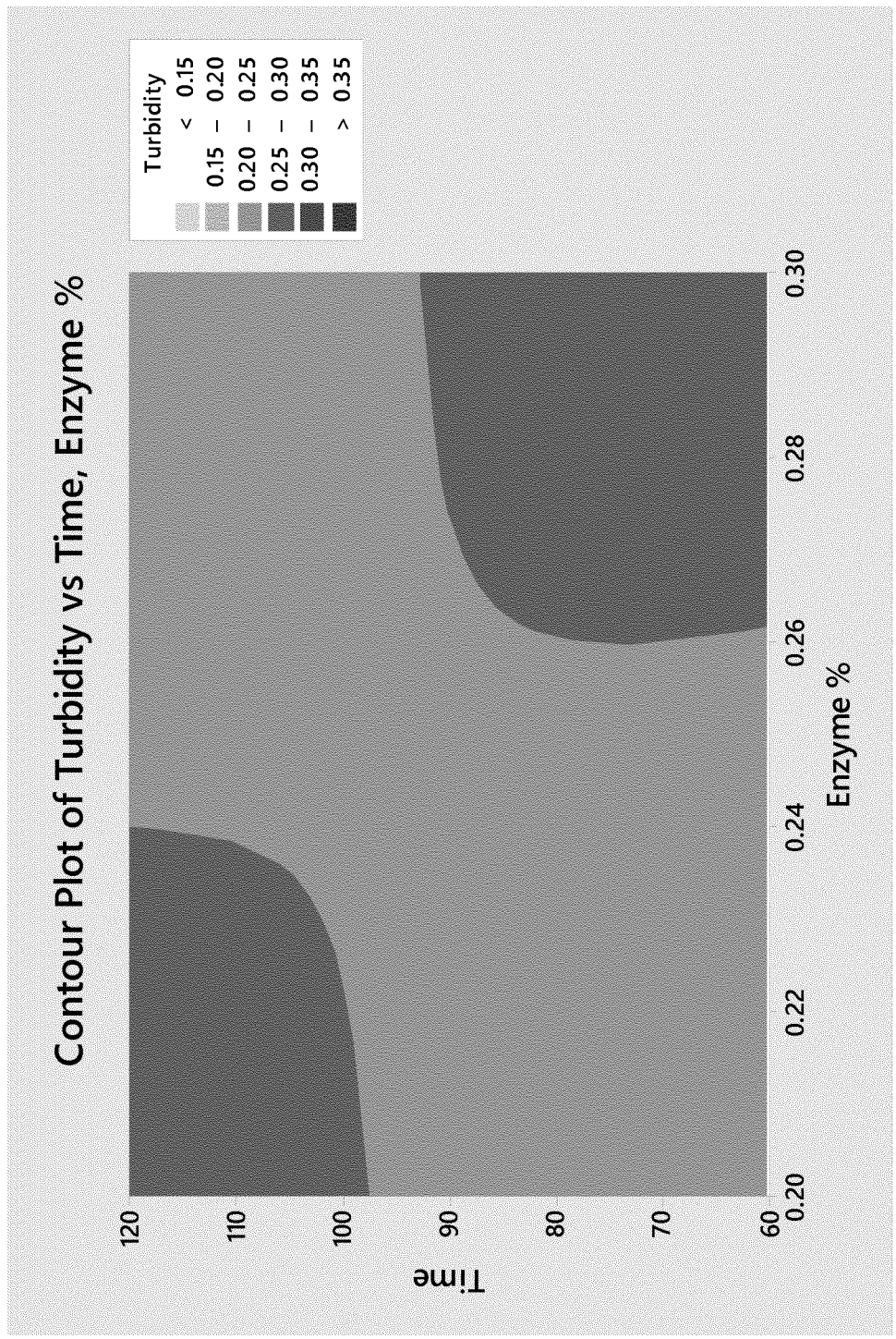
FIG. 5 is a graph showing a contour plot of turbidity vs. time and enzyme % from the experiment in Example 2 disclosed herein.

FIG. 5 shows the contour plot of turbidity vs time, enzyme %. As seen in this figure, less turbidity was found at longer hydrolysis time for higher enzyme content, whereas the turbidity was less at shorter hydrolysis time for lower enzyme content. No significant effect was seen on the viscosity of the finished product. Average viscosity was 6.3 cP+/−2.9.

Larger scale pilot plant productions were conducted for two cases in which 10 g and 15 g protein content were investigated while keeping the total calorie at 100 kcal (i.e., formulations 1 and 2 discussed above, respectively). For the hydrolysis step, the enzyme:protein ratio was kept at 0.3%, the activation temperature was 45-55° C., and the hydrolysis time varied between 90-180 min. The process was finished using ultra-heat treatment with direct steam injection to create shelf stable products. The temperature of the product at the hold tube exit was 150° C. The residence time in the hold tube was 2.15 seconds, and the operating flow rate was at 400 liters/hour.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of making a beverage, the method comprising:
   hydrolyzing protein with a protease; and
   adding one or more other ingredients to the hydrolyzed protein to form the beverage, which has an absorbance of 0.35 or lower at a wavelength of 600 nm measured using an ultraviolet and visible spectrophotometer, shelf-stability, about 15 g to about 25 g protein/100 kcal of the beverage, a neutral pH and an energy content of about 200 kcal to about 360 kcal per 240 ml of the beverage,
   wherein the hydrolyzed protein is at least 50 wt. % of the protein in the beverage.

2. The method of claim 1, wherein the protease is selected from the group consisting of trypsin, chymotrypsin, pancreatin, papain, bromelain, and pepsin and mixtures thereof.

3. The method of claim 1, wherein the beverage comprises the protease.

4. The method of claim 1, wherein the beverage is a ready-to-drink (RTD) beverage.

5. The method of claim 1, wherein the beverage contains zero fat.

6. The method of claim 1, wherein the one or more other ingredients comprise sugar in an amount up to 25% of the energy content of the beverage.

7. The method of claim 1, wherein the one or more other ingredients comprise tea.

8. A beverage that has an absorbance of 0.35 or lower at a wavelength of 600 nm measured using an ultraviolet and visible spectrophotometer, shelf-stability, about 15 g to about 25 g protein/100 kcal of the beverage, and a neutral pH, wherein the protein comprises hydrolyzed protein that is at least 50 wt. % of the protein in the beverage, and the beverage has an energy content of about 200 kcal to about 360 kcal per 240 ml of the beverage.

9. The beverage of claim 8 wherein the beverage comprises a protease that formed at least a portion of the hydrolyzed protein.

10. The beverage of claim 9 wherein the protease is selected from the group consisting of trypsin, chymotrypsin, pancreatin, papain, bromelain, pepsin and mixtures thereof.

11. The beverage of claim 8 wherein at least a portion of the hydrolyzed protein was formed by a protease, and the beverage contains the protease in inactivated form.

12. A method of making a beverage, the method comprising adding one or more other ingredients to hydrolyzed protein to form the beverage, which has an absorbance of 0.35 or lower at a wavelength of 600 nm measured using an ultraviolet and visible spectrophotometer, shelf-stability, about 15 g to about 25 g protein/100 kcal of the beverage, a neutral pH and an energy content of about 200 kcal to about 360 kcal per 240 ml of the beverage, wherein the hydrolyzed protein is at least 50 wt. % of the protein in the beverage.

13. The method of claim 12 comprising subjecting the hydrolyzed protein to ultra-high temperature (UHT) treatment.

14. The method of claim 12 wherein the beverage is a ready-to-drink (RTD) beverage.

15. The method of claim 12 wherein the beverage contains zero fat.

16. The method of claim 12 wherein the hydrolyzed protein comprises hydrolyzed whey protein.

17. The method of claim 12 wherein the one or more other ingredients comprise sugar in an amount up to 25% of the energy content of the beverage.

18. The method of claim 12 wherein the one or more other ingredients comprise tea.

19. The method of claim 1, wherein the hydrolyzed protein is at least 75 wt. % of the protein in the beverage.

20. The method of claim 1, wherein the hydrolyzed protein is at least 99 wt. % of the protein in the beverage.

* * * * *